Dec. 29, 1931.  H. SCHLAICH  1,838,962
INDICATING INSTRUMENT
Filed Sept. 20, 1927   2 Sheets-Sheet 1

INVENTOR
HERMAN SCHLAICH
BY Moses & Nolte
ATTORNEY

Dec. 29, 1931. H. SCHLAICH 1,838,962
INDICATING INSTRUMENT
Filed Sept. 20, 1927 2 Sheets-Sheet 2
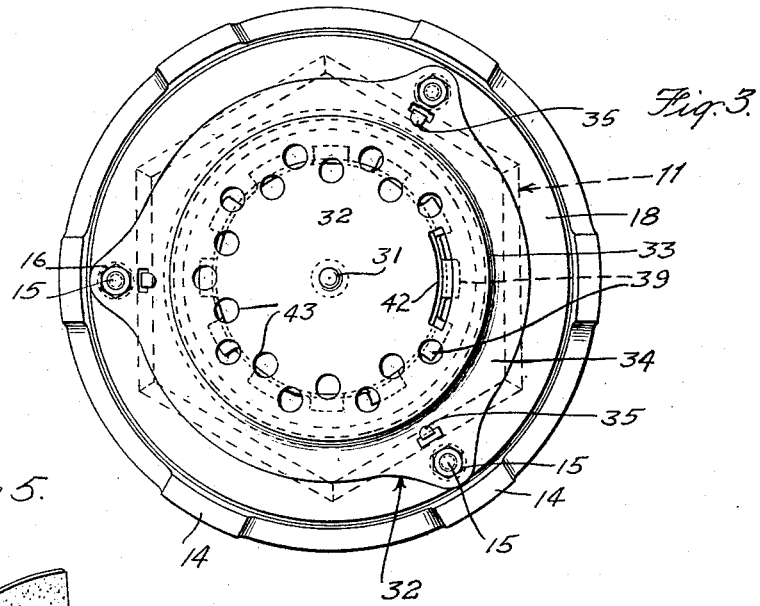
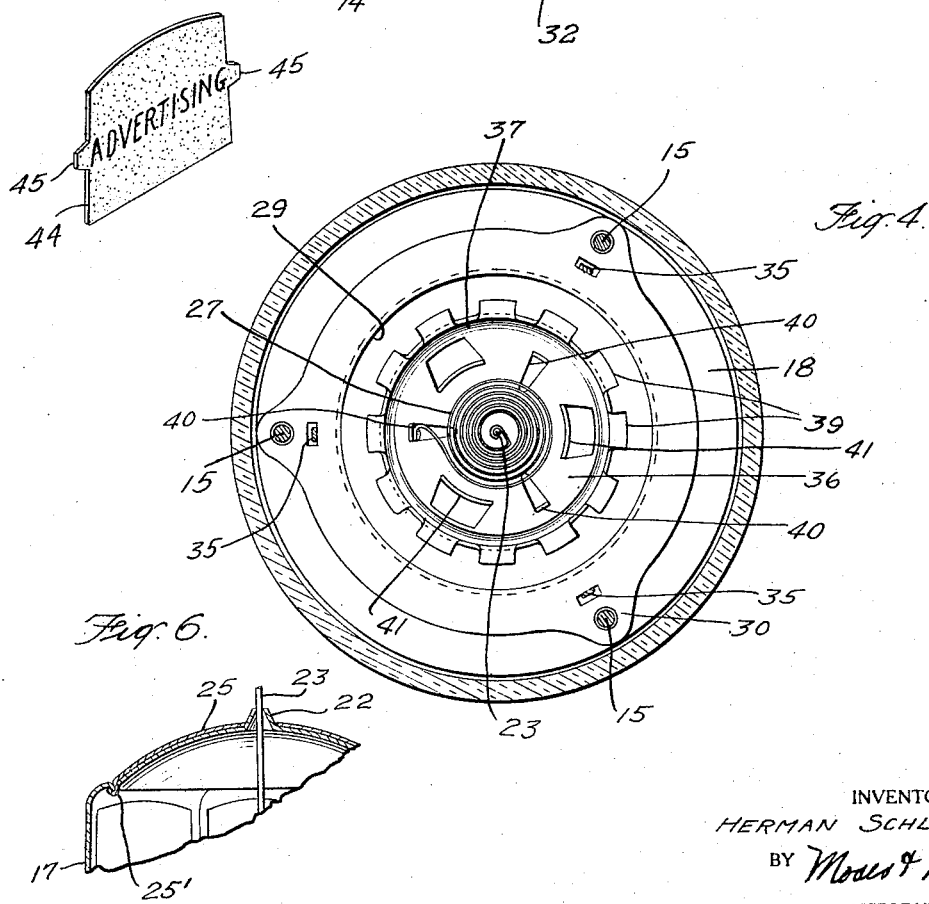
INVENTOR
HERMAN SCHLAICH
BY Moses & Nolte
ATTORNEY Patented Dec. 29, 1931

1,838,962

UNITED STATES PATENT OFFICE

HERMAN SCHLAICH, OF LONG ISLAND CITY, NEW YORK

INDICATING INSTRUMENT

Application filed September 20, 1927. Serial No. 220,666.

This invention relates to thermometers and similar instruments and more particularly to instruments adapted for use on articles such as desks and tables, and is in the nature of an improvement upon the invention disclosed in Letters Patent of the United States No. 1,478,258, granted to me on December 18, 1923.

The main object of the invention is to provide a novel and improved structure for such devices, simple in structure and attractive in appearance, economical to manufacture, convenient to assemble, and arranged for ready and effective adjustment, as for calibration purposes.

The invention will be understood from the following description taken in connection with the accompanying drawings in which:

Fig. 3 is a bottom view of the device shown in Fig. 1;

Fig. 4 is a sectional view taken along the line 4—4 of Fig. 2;

Fig. 5 is a view illustrating one of the removable panels; and

Fig. 6 is a detail view illustrating the attachment of the dial to the rest of the instrument.

Figure 1:
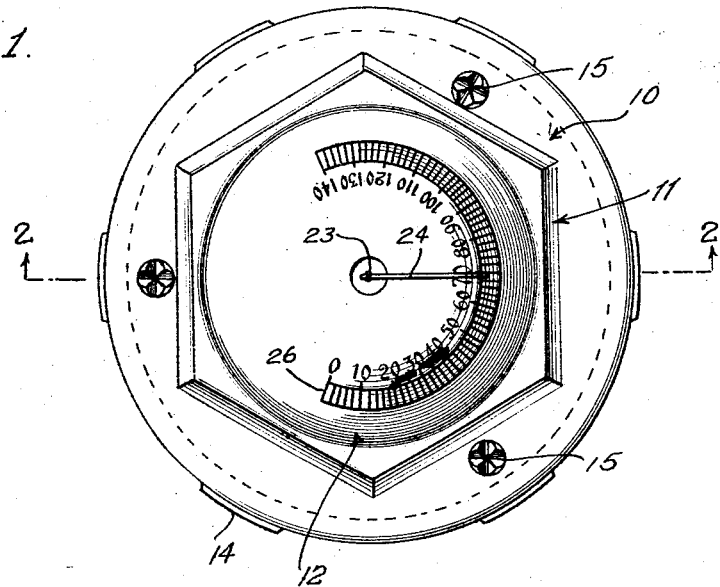
Fig. 1 is a top plan view illustrating one embodiment of the invention.

Referring to the drawings, the instrument includes a casing 10 of suitable material, such as glass, which includes a body portion 11 which may be hexagonal in cross section and tapered gradually from the botom to the top, an upper portion 12 in the form of a dome through which the indications of the instrument may be read, and a base in the form of an annular flange 13 extending outwardly from the lower end of the casing portion 11 and having a downwardly projecting peripheral flange provided at suitable intervals with feet 14 between which there are openings permitting the passage of air into and out of the casing. The remaining portions of the instrument may be inserted in said casing from below and held in position by screws or bolts 15 extending through the base flange 13 at suitable intervals and through other portions of the structure which are held to the flange 13 by said bolts 15 and nuts 16.

Figure 2:
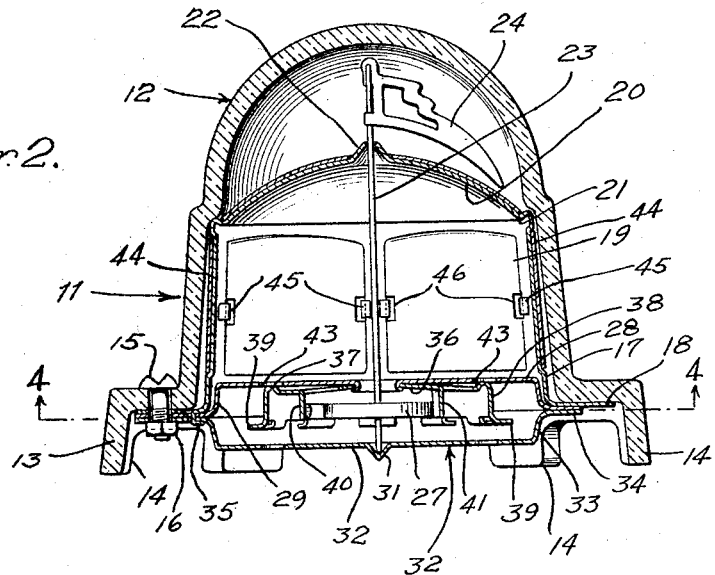
Fig. 2 is a sectional view taken along the line 2—2 of Fig. 1.

The instrument also comprises a metal shell 17 having a flange 18 designed to engage the lower face of the base flange 13 and a portion extending upwardly therefrom and of substantially the same shape as the glass casing portion 10 but provided with channel-like depressed portions 19 (Fig. 2). At the upper end of its hexagonal portion, shell 17 is formed into a dial support 20 having an annular channel 21 at its periphery, and at its center an upwardly projecting conical hollow portion 22 through which projects a stem or shaft 23 carrying an indicator 24 to cooperate with a dial 25 having at its center an opening to receive the conical member 22 and resting at its periphery in said channel 21. The dial 25 is provided with a suitable scale 26 to cooperate with the indicator or vane 24. The opening at the top of portion 22 provides a bearing for the shaft 23 at a point substantially above the dial, and therefore provides better side support for the shaft 23.

In the lower part of the instrument the shaft or stem 23 is attached at one end to a bi-metallic spring 27 which is supported in a manner to be described hereinafter on a member 28 provided with a circular opening to permit the passage of the stem 23 therethrough and being provided with a downwardly extending flange 29 from which project lugs 30 to receive the bolts 15. The stem 23 may rest at its lower end in a conical thrust bearing 31 formed in a protective member 32 having an upwardly extending flange 33 from which project ears or lugs 34 cooperating with lugs 30 and also receiving therethrough the shanks of the bolts 15. The member 32 is perforated to permit access of the air to the instrument proper which it serves to protect. The members 17, 28 and 32 may be assembled before insertion into the casing 10 and may be held together in assembled position by means of tongues 35 struck down from the outwardly extending flange 18 of the member 17, which are passed downwardly through openings in the ears 30 and 34 and clinched beneath the same.

The member 28 is formed at its center with an eyelet portion through which the stem 23 passes and of which the lower edge is spread to underlie the central portion of a member 36 pivoted thereon and to which the outer end of the bi-metallic strip 27 is attached as hereinafter described. The member 36 may be provided at its periphery with an annular ridge 37 which frictionally engages the lower face of the member 28 and with a flange 38 projecting downwardly at the outer side of said annular ridge and having at its lower edge outwardly projecting lugs or fingers 39 to facilitate the adjustment of member 36 to different positions about the eyelet at the center of member 28.

The member 36 is provided with downwardly projecting tongues 40 struck from the metal and turned downwardly and outwardly therefrom to positions substantially perpendicular to the central part thereof to provide suitable attaching means for the outer end of the bi-metallic strip or coil 27. The member 36 is also provided with members 41 struck downwardly from the metal thereof and arranged substantially in a circle to limit the outward movement of the bi-metallic strip 27 when jarred and thus to prevent straining of the strip beyond the elastic limit thereof. It will be apparent that by turning the member 36, the stem 23 of the indicator 24 may be turned to bring the indicator to a position to give the proper indications on the scale 26. To facilitate the adjustment of the member 36 and consequently of the indicator 24 the lower protective member 32 is provided with a slot 42 to permit insertion therethrough of an implement to engage the lugs 39 and turn the member 36. As indicated on Fig. 2, the member 28 may be provided with suitable openings 43 immediately above the annular ridge 38 of the member 36.

As indicated in Fig. 6, the dial 25 may be secured in position on the dial support 20 by means of tongues 25' projecting through openings in the bottom of the annular channel 21 and clinched beneath the metal at the outer edge of said channel. Preferably the depressed panel-like portions 19 of the member 17 are used to hold certain panel members 44 which may be used for ornamental or advertising purposes and may be secured in position by tongues 45 extending through openings 46 in the shell 17 and clinched inside the shell.

It will be understood that the feature of forming the outer casing and base all in one piece is very advantageous and that the portion of the instrument to be placed inside said casing is so arranged as to be especially adapted for assembly of the parts and for insertion in and removal from the casing member. The parts of the instrument are also designed to provide an easy and effective adjustment of the bi-metallic strip to effect suitable calibration of the instrument.

While I have illustrated and described in detail certain preferred forms of my invention, it is to be understood that changes may be made therein and the invention embodied in other structures. I do not, therefore, desire to limit myself to the specific constructions illustrated but intend to cover my invention broadly in whatever form its principle may be utilized.

Having thus described my invention, I claim:

1. An indicating instrument, including a shell having a convex upper face, an annular channel in the margin thereof and a boss at the center thereof, a dial seated at its edge in said channel and fitting the boss, a shaft passing centrally through the dial and the top of said shell and having bearing in said boss, an indicator on said shaft above said dial, and means for rotating the shaft.

2. An indicating instrument, including a shell having a top with an annular channel and openings therethrough in said channel, a dial seated at its edge in said channel and provided with tongues passing through said openings and engaging the inner surface of the shell, a shaft passing centrally through the dial, an indicator on said shaft above said dial and means for rotating the shaft.

3. An indicating instrument, including a shell having at its top a central upward projection with a central opening, a dome-shaped dial having a central opening to receive the upward projection on said shell, means to secure the dial to said shell, a shaft passing through the opening in the central upward projection of the shell, a vane on said shaft above said dial, and means for rotating the shaft.

4. An indicating instrument, including a shell having at its top a central upward hollow projection with a central bearing opening at its top, a dome-shaped dial having a central opening to receive the upward projection on said shell, a shaft passing through the bearing opening in the central upward projection of the shell, and a vane on said shaft above said dial, a bi-metallic strip connected at one end with said shaft and at the other end with said shell, and a member providing a bearing for the lower end of said shaft.

5. An indicating instrument, including a shell having a dome-shaped top with a peripheral annular channel and a central upward projection with an opening therein, a dome-shaped dial fitting over the top of the shell with its edge seated in said channel, said dial having a central opening to receive said upward projection, an indicator operating above said dial, and means for operating the indicator.

6. An indicating instrument, including a shell having a dome-shaped top and a body portion of substantially regular polygonal cross-section, a transparent housing enclosing said shell and substantially fitting the body portion thereof, the sides of said body portion being perforated to facilitate the attachment thereto of display panels, a dome-shaped dial fitting on the top of said shell, a shaft passing through the center of said dial, an indicator on said shaft adjacent said dial, and means for rotating the shaft.

7. An indicating instrument, including a shell having a dome-shaped top, a body portion of substantially regular polygonal cross-section and an outstanding flange at the base of said body portion, a dome-shaped dial fitting on the top of said shell, a shaft passing through the center of said dial, an indicator on said shaft adjacent said dial, a bi-metallic coil connected at one end with said shell and at the other end to said shaft, a glass casing open at the bottom for insertion of the other parts and having a dome portion over said dial and indicator, a polygonal body portion, and an outstanding flange to the lower side of which the base flange of said shell is secured.

8. A temperature indicating device, including a supporting plate having a central opening, a shaft extending through said opening, a member pivoted to said plate at its lower side to turn around said opening and held frictionally against rotation, said member having a lug projecting therefrom and openings arranged in a circle in the marginal portion thereof, a bi-metallic coil attached at one end to said shaft and at the other end to said lug, and a protective plate beneath said pivoted member and having an opening at a distance from the axis of the shaft to permit access to said openings arranged in a circle for adjustment of the pivoted member, said plate being also provided with a depression forming an end bearing and support for the lower end of the shaft, and in which the shaft rests.

9. A temperature indicating device, including a supporting plate having a central opening, a shaft extending through said opening, a member pivoted to said plate at its lower side to turn around said opening and held frictionally against such turning, said member having downward projections arranged in a circle at its periphery and a lug projecting downwardly inside said circle, a bi-metallic coil attached at one end to said shaft and at the other end to said lug, and a plate beneath said downward projections and said coil and having a central bearing for the lower end of said shaft and an arcuate slot beneath said projections to permit engagement thereof through said slot and adjustment thereby of said coil.

10. A temperature indicating instrument, including a supporting plate having a central opening, an adjusting member pivotally mounted on said plate to turn about said opening and having circularly arranged downwardly projecting guides, an indicator shaft extending through said opening, and a bi-metallic coil attached at one end to said shaft and at the other end to said adjusting member and positioned within said circularly arranged projections, but normally out of engagement therewith, said projections being positioned, however, in such proximity to the coil that permanent distortion of the coil by jarring is prevented.

11. In an indicating instrument, a dial, a shell carrying said dial and having a body portion with an outwardly extending flange at its base, a central shaft projecting through said dial, controlling means for said shaft comprising a supporting member with a central opening for said shaft and extending beneath said flange, an adjusting member supported by said supporting member for rotation about said opening, a bi-metallic coil attached at one end to said shaft and at the other end to said adjusting member, a plate protecting the lower end of the instrument and having a bearing for the lower end of said shaft, a single piece glass casing having a top through which the indicator and dial may be observed and having at its lower edge a base portion including an outwardly extending peripheral flange and a flange extending downwardly from the outer edge of said outwardly extending flange, and means to secure said shell, supporting member and protecting plate to said outwardly extending flange of the casing.

12. In an indicating instrument, a single piece glass casing open at the bottom only and comprising an annular base with a downwardly projecting flange cut away at its lower edge to admit air, a body portion projecting upwardly from said base and a dome at the top of said body portion; a metal shell having a dial-carrying portion, a body portion to fit into said body portion of the casing and a base projecting beneath the annular base of the casing but inside the downwardly projecting flange; a thermostatic coil; means for adjusting one end of the thermostatic coil including a supporting member having a portion extending beneath the annular base of the casing; a base plate extending beneath the annular base of the casing; and means for securing said shell, supporting member and base plate to said annular base of the casing.

13. In an indicating instrument, a dial, a shell carrying said dial and having a body portion with an outwardly extending flange at its base, a central shaft projecting through said dial, controlling means for said shaft comprising a supporting member with a central opening for said shaft and extending beneath said flange, an adjusting member supported by said supporting member for rotation about said opening, a bi-metallic coil attached at one end of said shaft and at the other end to said adjusting member, a plate protecting the lower end of the instrument and having a bearing for the lower end of said shaft, a single piece glass casing having a top through which the indicator and dial may be observed and having at its lower edge a base portion including an outwardly extending peripheral flange and a flange extending downwardly from the outer edge of said outwardly extending flange, means to secure said supporting member and protecting plate to the outwardly extending base flange of the body portion of the shell to enable these parts to be inserted and removed as a unit, and means to secure said shell, supporting member and protecting plate to said outwardly extending flange of the casing.

14. An indicating instrument adapted for advertising purposes comprising a movement housing having lateral walls, an indicator thereabove, means in the housing and connected to the indicator to operate the same, and a one piece transparent glass enclosure for the housing and indicator substantially fitting the lateral walls of the housing, the lateral walls of the housing being perforated to facilitate the securement thereto of advertising panels visible through the glass enclosure.

In testimony whereof I have affixed my signature to this specification.

HERMAN SCHLAICH.